United States Patent
Su et al.

(10) Patent No.: US 10,465,588 B2
(45) Date of Patent: Nov. 5, 2019

(54) METHOD FOR ESTIMATING EFFICIENCY OF A PARTICULATE FILTER

(71) Applicant: AUTOMOTIVE RESEARCH & TESTING CENTER, Lugong (TW)

(72) Inventors: Siou-Sheng Su, Lugong (TW); Sheng-Chieh Cheng, Lugong (TW); Yong-Yuan Ku, Lugong (TW); Ke-Wei Lin, Lugong (TW)

(73) Assignee: AUTOMOTIVE RESEARCH & TESTING CENTER, Lugong, Changhua County (TW)

( * ) Notice: Subject to any disclaimer, the term of this patent is extended or adjusted under 35 U.S.C. 154(b) by 69 days.

(21) Appl. No.: 15/857,874

(22) Filed: Dec. 29, 2017

(65) Prior Publication Data

US 2019/0203628 A1    Jul. 4, 2019

(51) Int. Cl.
| | | |
|---|---|---|
| *F01N 11/00* | (2006.01) | |
| *F01N 9/00* | (2006.01) | |
| *F01N 3/025* | (2006.01) | |
| *B01D 46/00* | (2006.01) | |

(52) U.S. Cl.
CPC .......... *F01N 11/002* (2013.01); *F01N 3/025* (2013.01); *F01N 9/002* (2013.01); *B01D 46/0063* (2013.01); *F01N 2240/14* (2013.01); *F01N 2560/06* (2013.01); *F01N 2560/08* (2013.01); *F01N 2900/1606* (2013.01)

(58) Field of Classification Search
CPC ........ F01N 11/002; F01N 9/002; F01N 3/025; F01N 2900/1606; F01N 2240/14; F01N 2560/08; F01N 2560/06; B01D 46/0063
See application file for complete search history.

(56) References Cited

U.S. PATENT DOCUMENTS

| | | | | |
|---|---|---|---|---|
| 4,651,524 A | * | 3/1987 | Brighton | ................. F01N 3/025 55/282 |
| 8,869,518 B2 | | 10/2014 | Yetkin | |
| 9,091,190 B2 | | 7/2015 | Sarsen et al. | |
| 2010/0242443 A1 | * | 9/2010 | Kodama | ................. F01N 9/002 60/277 |
| 2011/0283685 A1 | | 11/2011 | Kotrba et al. | |
| 2012/0180463 A1 | * | 7/2012 | Oohashi | ............. B01D 46/0057 60/297 |

FOREIGN PATENT DOCUMENTS

| | | |
|---|---|---|
| CN | 101793666 A | 8/2010 |
| CN | 101896699 B | 10/2012 |
| CN | 104411931 B | 3/2017 |

* cited by examiner

*Primary Examiner* — Brandon D Lee
(74) *Attorney, Agent, or Firm* — Hamre, Schumann, Mueller & Larson, P.C.

(57) ABSTRACT

A method for estimating efficiency of a particulate filter of a vehicle is provided. The method includes: calculating a first estimated value representing an amount of particulate matters (PM) accumulated in the particulate filter; upon determining to perform regeneration of the particulate filter based on the first estimated value, injecting fuel into the particulate filter and combusting the PM; calculating a second estimated value representing an amount of particulate matters accumulated in the particulate filter after the regeneration; and determining whether a PM accumulation condition of the particulate filter requires user attention based on the second estimated value.

8 Claims, 2 Drawing Sheets

METHOD FOR ESTIMATING EFFICIENCY OF A PARTICULATE FILTER

FIELD

The disclosure relates to a method for estimating efficiency of a particulate filter of a vehicle.

BACKGROUND

Due to the rise in environmental consciousness, a particulate filter is utilized to remove particulate matters from exhaust gas of a diesel engine. Since the efficiency of the particulate filter decreases gradually after a period of use, a regeneration process for the particulate filter is required when the amount of the particulate matters accumulated in the particulate filter exceeds a certain threshold. Ideally, the particulate matters in the articulate filter are supposed to be completely combusted in the regeneration process without leaving residue in the particulate filter. However, the regeneration process may be adversely affected by various factors, e.g., lack/excess of fuel introduced into the particulate filter, inappropriate combustion temperature, etc., thereby leading to incomplete combustion of the particulate matters. Furthermore, residual ash resulting from combustion of the particulate matters would accumulate in the particulate filter after the regeneration process and the presence of residual ash adversely affects efficiency of the particulate filter.

SUMMARY

Therefore, an object of the present disclosure is to provide a method for estimating efficiency of particulate filter of a vehicle.

According to one aspect of the present disclosure, a method for estimating efficiency of a particulate filter of a vehicle is provided. The particulate filter includes an inlet in fluid connection with an exhaust valve of an engine of the vehicle for receiving exhaust gas discharged from the engine, a fuel injection end for introducing fuel into the particulate filter, and an outlet for discharging gas filtered by the particulate filter.

The method includes the following steps of:
calculating a first estimated value of an estimated particulate matter (PM) accumulation amount based on a pressure drop between the inlet and the outlet, and a flow rate of gas flowing through the particulate filter, the first estimated value representing an amount of PM accumulated in the particulate filter;
determining whether to perform regeneration of the particulate filter based on the first estimated value;
upon determining to perform regeneration of the particulate filter, injecting fuel into the particulate filter through the fuel injection end and combusting the PM;
calculating a second estimated value of the estimated PM accumulation amount based on the pressure drop between the inlet and the outlet, and the flow rate of gas flowing through the particulate filter, the second estimated value representing an amount of PM accumulated in the particulate filter after the regeneration; and
determining whether a PM accumulation condition of the particulate filter requires user attention based on the second estimated value.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
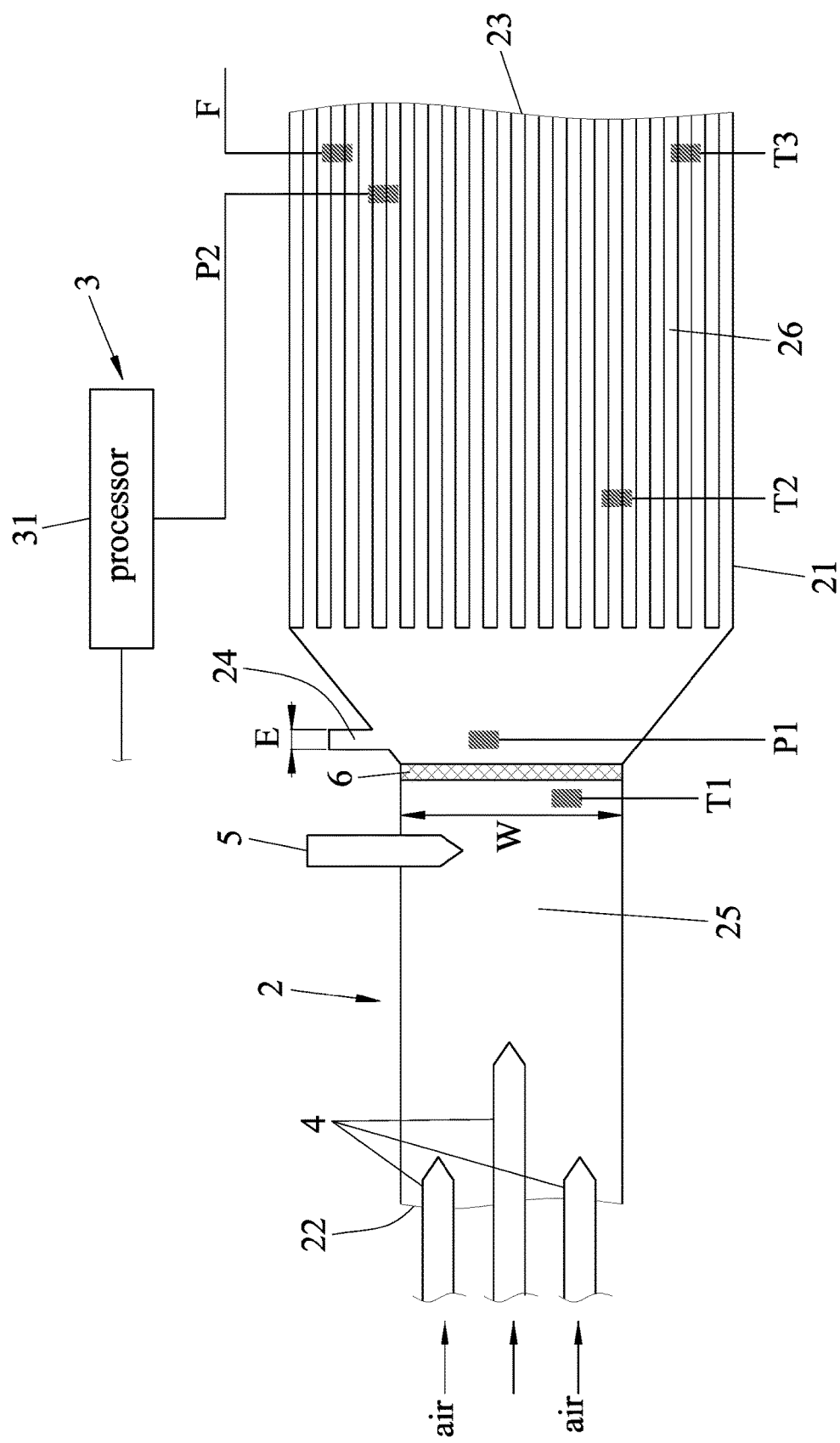
FIG. 1 is a schematic view of a particulate filter of a vehicle to be used with a method for estimating efficiency thereof according to an embodiment of the present disclosure.

A method for estimating efficiency of a particulate filter 2 of a vehicle (see FIG. 1) is provided.

The vehicle includes the particulate filter 2, a detecting device 3, a fuel introducing device 4 and an ignition device 5. The particulate filter 2 includes a housing 21, a fuel injection end 22, an inlet 24, an outlet 23 and a separator 6. The housing 21 defines an inner space therein which has a regeneration region 25 close to the fuel injection end 22 and a filtering region 26 close to the inlet 24. The fuel injection end 22 is for introducing fuel and air into the inner space defined by the housing 21. In detail, the fuel injection end 22 may be configured with openings for entrance of air and for extension of the fuel introducing device 4 into the regeneration region 25 therethrough. The inlet 24 is in fluid connection with an exhaust valve of an engine (not shown) of the vehicle for receiving exhaust gas (E) discharged from the engine. The outlet 23 is for discharging gas filtered by the particulate filter 2.

The particulate filter 2 includes a plurality of filtering tubes disposed in the filtering region 26. Each of the filtering tubes extends in a direction along which the inlet 24 is spaced apart from the outlet 23 (a horizontal direction in this embodiment viewing at FIG. 1), and is defined by a corresponding tube wall having a thickness (w) for filtering particulate matter (PM). With the presence of the filtering tubes, a porous structure is formed in a portion of the particulate filter 2 that corresponds to the filtering region 26 (i.e., to the right of the separator 6 in FIG. 1), with each filtering tube defining a pore. The separator 6 is disposed between the regeneration region 25 and the filtering region 26 and is formed with a plurality of apertures. In one embodiment, each of the apertures has a diameter ranging from 0.1 millimeter (mm) to 1.3 mm, and the separator 6 has a thickness smaller than 1.5 mm. The ignition device 5 is disposed in the regeneration region 25 adjacent to the separator 6 for igniting the fuel introduced into the regeneration region 25 from/by the fuel introducing device 4.

The detecting device 3 includes a processor 31, three temperature sensors (T1, T2, T3), two pressure sensors (P1, P2), and a flow sensor (F) that are electrically connected to the processor 31. The temperature sensors (T1, T2, T3) are respectively mounted adjacent to the inlet 24, in an intermediate portion of the filtering region 26, and adjacent to the outlet 23 for detecting respective temperatures thereat. The pressure sensors (P1, P2) are mounted respectively adjacent to the inlet 24 and the outlet 23 for detecting respective pressures thereabout. The flow sensor (F) is mounted adjacent to the outlet 23 to detect a flow rate of gas flow flowing through the filtering region 26. It is noted that the flow sensor (F) may be mounted adjacent to the inlet 24 in other embodiments since the air flow rates at the outlet 23 and the inlet 24 should be the same, theoretically.

In this embodiment, the processor 31 calculates an estimated particulate matter (PM) accumulation amount (e.g., a first estimated value (A1) or a second estimated value (A2) in the following paragraphs) representing an amount of PM accumulated in the particulate filter 2 based on a pressure drop between the inlet 24 and the outlet 23, which may be determined based on the pressures obtained by the pressure sensors (P1, P2), and the flow rate of gas obtained by the flow sensor (F). The pressure drop between the inlet 24 and the outlet 23 may particularly be a pressure drop from the inlet 24 to the outlet 23. In this embodiment, the pressure drop between the inlet 24 and the outlet 23 may be stored in a storage device, such as a register.

Specifically, the estimated PM accumulation amount is calculated according to Equations (1) and (2) derived from Darcy's Law shown below:

$$\Delta P = \frac{\mu Q}{2V_{dpf}}(\alpha + w)^2 \left[ \frac{w}{k_o \alpha} + \frac{1}{2k_{soot}} \ln\left(\frac{\alpha}{\alpha - 2w_s}\right) \right] \quad (1)$$

$$w_s = \frac{\alpha - \sqrt{\alpha^2 - \frac{m}{N_{cell} \rho_{PM} L}}}{2}, \quad (2)$$

where $\Delta P$ is the pressure drop from the inlet 24 to the outlet 23, $\mu$ is a viscosity coefficient of air flow, Q is a volume flow rate of the air, a is a sectional width of each filtering tube in the filtering region 26, w is the thickness of each tube wall defining the corresponding filtering tube of the filtering region 26, $V_{dpf}$ is a volume of the filtering region 26, $k_o$ is a permeability coefficient of fluid through (the filtering tubes of) the filtering region 26 when the filtering region 26 is clean, $k_{soot}$ is a permeability coefficient of fluid through (the filtering tubes of) the filtering region 26 when the filtering region 26 has captured some PM, $w_s$ is a thickness of the accumulation of PM in the filtering region 26 (e.g., an average accumulation thickness of PM in the filtering tubes), m is the accumulated amount of PM captured by the particulate filter 2, which is represented herein by the estimated PM accumulation amount to be calculated, $N_{cell}$ is a number of the filtering tubes in the filtering region 26, $\rho_{PM}$ is a density of the PM, and L is a length of the filtering region 26 in the direction along which the inlet 24 and the outlet 23 are spaced apart.

Figure 2:
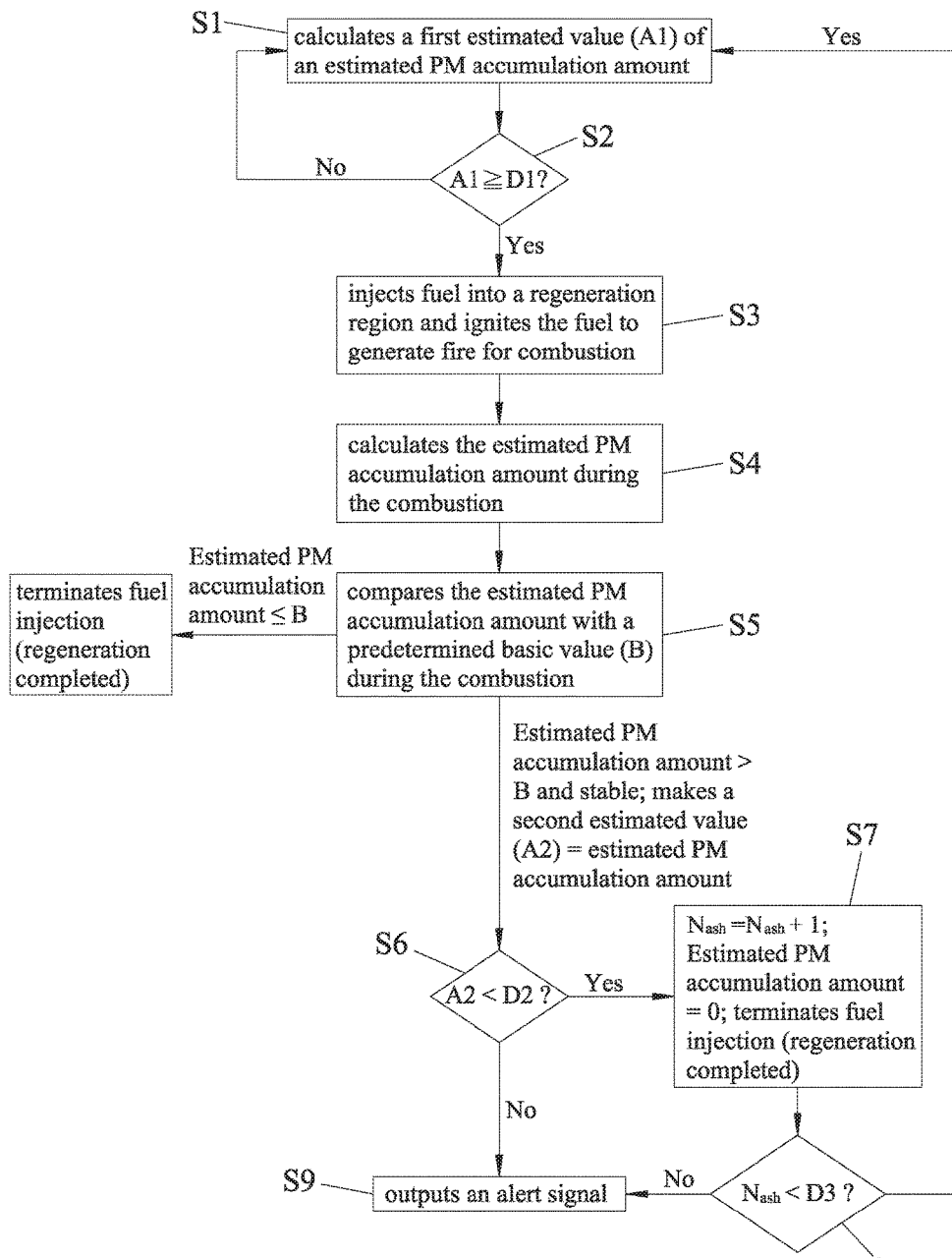
FIG. 2 is a flow chart of the method.

Further referring to FIG. 2, a flow chart of the method for estimating efficiency of the particulate filter 2 is illustrated. In step S1, the processor 31 calculates the first estimated value (A1) of an estimated PM accumulation amount, where the first estimated value (A1) represents an amount of PM accumulated in the particulate filter 2 before regeneration of the particulate filter 2. Note that the detecting device 3 may further include a timer (not shown) for measuring a time duration the particulate filter 2 is used to capture PM of exhaust gas from the inlet 24 (to be measured from right after the particulate filter 2 has started capturing PM). In one embodiment, the timing to calculate the first estimated value (A1) is, for example, when the time duration measured by the timer exceeds a predetermined duration. The timing to calculate the first estimated value (A1) can also be user-determined in other embodiments of this disclosure and the disclosure is not limited in this respect.

In step S2, the processor 31 determines whether the first estimated value (A1) is equal to or greater than a first predetermined value (D1). When the determination made in step S2 is affirmative, the flow of the method goes to step S3; and the flow goes back to step S1 when otherwise. The first predetermined value (D1) represents a threshold value for the amount of PM accumulated in the particulate filter 2 that will adversely affect efficiency of the particulate filter 2. That is to say, when the first estimated value (A1) obtained in step S1 is determined to be equal to or greater than the first predetermined value (D1), it is required to combust the PM accumulated in the particulate filter 2, which is also known as a regeneration process.

In step S3, the processor 31, which is also connected to an engine control unit (not shown) of the vehicle, enables the same to control the fuel introducing device 4 to inject fuel into the regeneration region 25 and then to control the ignition device 5 to ignite the fuel in the regeneration region 25 to generate fire at a position adjacent to the filtering region 26 for raising the temperature in the filtering region 26 to, for example about 650° C., thereby combusting the PM in the filtering region 26. Note that the fire in the regeneration region 25 can be blocked from entering the filtering region 26 by the separator 6 which is made of a heat resistance material such as ceramic, metal, etc. and which can retain its structural strength or integrity when experiencing a relatively high temperature, e.g., about 650° C. By virtue of the separator 6, the fire generated by burning the fuel can stay in the regeneration region 25, thereby enhancing stableness of the temperature for combusting the PM in the filtering region 26. Additionally, in other embodiments of this disclosure, another separator (not shown), which is made of the same material as the separator 6 and which is also formed with a plurality of apertures, can be disposed between the fuel introducing device 4 and the ignition device 5 to thereby block the fire created due to fuel ignition from entering the fuel introducing device 4 under guidance of airflow during the regeneration process.

In order to maintain the temperature in the filtering region 26 at a certain level during combustion of the PM, a flow rate of the fuel introduced into the particulate filter 2 may be calculated according to Equation (3) shown below:

$$f = \frac{a_{dpf} h_{dpf}(T_{dpf} - T_a) + C_p W_{out}(T_{dpf} - T_{ex})}{k_f \Delta H_f}, \quad (3)$$

where f represents the flow rate of the fuel, $a_{dpf}$ is a cross-sectional area of the filtering region 26, $h_{dpf}$ is the thermal conductivity coefficient of the particulate filter 2, $T_{dpf}$ is a temperature in the intermediate portion of the filtering region 26 obtained by the temperature sensor (T2), $T_a$ is an environmental temperature, $T_{ex}$ is a temperature of the exhaust gas obtained by the temperature sensor (T3), $C_p$ is a thermal capacity coefficient of the portion of the particulate filter 2 corresponding to the filtering region 26, $W_{out}$ is a mass flow rate of the exhaust gas, $K_f$ is a coefficient of reaction of the fuel, and $\Delta H_f$ is enthalpy of the fuel.

In one embodiment, the fuel introducing device 4 is electrically connected to and controlled by the processor 31 to stop providing fuel to the particulate filter 2 when the pressure drop between the inlet 24 and the outlet 23 as determined from the pressures obtained by the pressure sensors (P1, P2) approximates to a predetermined value, e.g., zero.

Subsequently, in step S4, the processor 31 calculates, during combustion of the PM and according to Equations (1) and (2), the estimated PM accumulation amount based on the pressure drop between the inlet 24 and the outlet 23 obtained based on the pressures measured by the pressure sensors (P1, P2), and the flow rate of gas flowing through the filtering region 26 obtained by the flow sensor (F). It is noted the processor 31 may continuously or periodically calculate the estimated PM accumulation amount during the combustion of PM (i.e., the regeneration of the particulate filter 2).

In step S5, the processor 31 compares the estimated PM accumulation amount with a predetermined basic value (B) to determine whether there is ash left in the filtering region 26 during the combustion. When the estimated PM accumulation amount is not greater than the predetermined basic value (B), the processor 31 determines that there is no ash left in the filter region 26, so the regeneration of the particulate filter 2 is accomplished, injection of the fuel into the particulate filter 2 from the fuel introducing device 4 is terminated, and the flow ends. When the estimated PM accumulation amount is greater than the predetermined basic value (B) and remains stable (i.e., variation between consecutively computed estimated PM accumulation amounts falls within a predetermined range) for a predetermined time duration (e.g., 2 minutes), the processor 31 makes the "stable" estimated PM accumulation amount the second estimated value (A2), and determines that there is ash accumulated in the filtering region 26 after the regeneration, and the flow then goes to step S6. The second estimated value (A2) represents an amount of the PM accumulation remaining in the particulate filter 2 after completion of the regeneration. The predetermined basic value (B) is zero in this embodiment and can be set as any desired value in other embodiments of this disclosure.

In step S6, the processor 31 determines whether the second estimated value (A2) is smaller than a second predetermined value (D2) which is greater than the predetermined basic value (B). The flow goes to step S7 when the determination made in step S6 is affirmative, and goes to step S9 when otherwise. The second predetermined value (D2) is an upper limit for the amount of PM accumulated in the particulate filter 2 to be acceptable, beyond which the amount of PM accumulated in the particulate filter 2 would degrade efficiency of the particulate filter 2 to an unacceptable level. The second predetermined value (D2) can be defined by the manufacturer of the particulate filter 2 or a user.

Since the pressure drop between the inlet 24 and the outlet 23 would not be zero when there is ash accumulated in the filtering region 26, in step S7, the processor 31 sets the pressure drop between the inlet 24 and the outlet 23 to zero (e.g., changing the value stored in the register for the pressure drop to zero) to indicate that the regeneration of the particulate filter 2 is accomplished, and adds one to an ash accumulation number ($N_{ash}$) representing a number of times of determining that there is ash accumulated in the particulate filter 2 after regeneration of the particulate filter 2, and the flow goes to step S8. It is noted herein that upon acknowledging the indication that the regeneration of the particulate filter 2 has been completed, the processor 31 may terminate the injection of the fuel into the particulate filter 2 from the fuel introducing device 4.

In step S8, the processor 31 determines whether the ash accumulation number ($N_{ash}$) is smaller than a third predetermined value (D3). The flow goes back to step S1 when the determination made in step S8 is affirmative, and goes to step S9 when otherwise.

In step S9, the processor 31 enables a notifying unit (not shown) to output an alert signal to notify the user that the particulate filter 2 requires replacement (or cleaning). The notifying unit may be, for example, a speaker unit to output sound as the alert signal, a lamp unit to emit light as the alert signal, a display unit to display an image as the alert signal, or a combination of the above. In one embodiment, the notifying unit may output the alert signal every time the vehicle is restarted.

In other words, steps S6 to S9 cooperatively accomplish determining whether a PM accumulation condition of the particulate filter 2 requires user attention or intervention based on the second estimated value (A2).

To sum up, by virtue of the present disclosure, the amount of ash (or PM) accumulated in the particulate filter 2 during the regeneration process can be calculated, so as to determine whether the particulate filter 2 requires cleaning or replacement. When the accumulated value of ash exceeds the second predetermined value (D2) or the number of times the processor 31 determines that there is ash accumulated in the particulate filter 2 exceeds the third predetermined value (D3), the user can be notified by an alert signal, such as sound, light, image or combinations thereof, to thereby clean or replace the particulate filter 2 in time, thus preventing the efficiency of the particulate filter 2 from being degraded to an unacceptable level.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for estimating efficiency of a particulate filter of a vehicle, the particulate filter including an inlet in fluid connection with an exhaust valve of an engine of the vehicle for receiving exhaust gas discharged from the engine, a fuel injection end for introducing fuel into the particulate filter, and an outlet for discharging gas filtered by the particulate filter, the method comprising the following steps of:

calculating a first estimated value of an estimated particulate matter (PM) accumulation amount based on a pressure drop between the inlet and the outlet, and a flow rate of gas flowing through the particulate filter, the first estimated value representing an amount of PM accumulated in the particulate filter;

determining whether to perform regeneration of the particulate filter based on the first estimated value;

upon determining to perform regeneration of the particulate filter, injecting fuel into the particulate filter through the fuel injection end and combusting the PM;

calculating a second estimated value of the estimated PM accumulation amount based on the pressure drop between the inlet and the outlet, and the flow rate of gas flowing through the particulate filter, the second estimated value representing an amount of PM accumulated in the particulate filter after completion of the regeneration;

determining whether a PM accumulation condition of the particulate filter requires user attention based on the second estimated value; and after completion of the regeneration, setting the pressure drop between the inlet and the outlet to zero, wherein the step of determining whether the PM accumulation condition in the particulate filter requires user attention includes:

determining whether the second estimated value is between a second predetermined value and a predetermined basic value which is smaller than the second predetermined value;

upon determining that the second estimated value is between the second predetermined value and the predetermined basic value, adding one to an ash accumulation number representing a number of times of determining that there is ash accumulated in the particulate filter after regeneration of the particulate filter; and determining that the PM accumulation condition of the particulate filter requires the user attention when the ash accumulation number is not smaller than a third predetermined value.

2. The method as claimed in claim 1, further comprising a step of:

upon determining that the PM accumulation condition of the particulate filter requires user attention, outputting an alert signal indicating that the particulate filter requires replacement.

3. The method as claimed in claim 1, further comprising steps, before the step of injecting fuel into the particulate filter, of:

determining whether the first estimated value is greater than a first predetermined value; and implementing the step of injecting fuel into the particulate filter when it is determined that the first estimated value is greater than the first predetermined value.

4. The method as claimed in claim 1, wherein the second estimated value is determined after the estimated PM accumulation amount has remained stable for a predetermined time duration during the combustion, and wherein the step of determining whether the PM accumulation condition of the particulate filter requires user attention includes:

determining whether the second estimated value is smaller than a second predetermined value; and determining that the PM accumulation condition of the particulate filter requires user attention upon determining that the second estimated value is not smaller than the second predetermined value.

5. The method as claimed in claim 4, wherein the step of determining whether the PM accumulation condition in the particulate filter requires user attention further includes:

upon determining that the second estimated value is smaller than the second predetermined value, adding one to an ash accumulation number representing a number of times of determining that there is ash accumulated in the particulate filter after regeneration of the particulate filter when the second estimated value is greater than a predetermined basic value which is smaller than the second predetermined value; and determining that the PM accumulation condition of the particulate filter requires user attention when the ash accumulation number is not smaller than a third predetermined value.

6. The method as claimed in claim 1, wherein the particulate filter defines an inner space having a regeneration region close to the fuel injection end and a filtering region close to the inlet, and the particulate filter further includes a separator that is formed with a plurality of apertures and that is disposed between the regeneration region and the filtering region, wherein the step of injecting fuel into the particulate filter includes injecting the fuel into the regeneration region through the fuel injection end, and igniting the fuel to generate fire in the regeneration region at a position adjacent to the filtering region, the fire being blocked by the separator from entering the filtering region.

7. The method as claimed in claim 6, wherein each of the apertures has a diameter ranging from 0.1 millimeter (mm) to 1.3 mm, and the separator has a thickness smaller than 1.5 mm.

8. A method for estimating efficiency of a particulate filter of a vehicle, the particulate filter including an inlet in fluid connection with an exhaust valve of an engine of the vehicle for receiving exhaust gas discharged from the engine, a fuel injection end for introducing fuel into the particulate filter, and an outlet for discharging gas filtered by the particulate filter, the method comprising the following steps of:

calculating a first estimated value of an estimated particulate matter (PM) accumulation amount based on a pressure drop between the inlet and the outlet, and a flow rate of gas flowing through the particulate filter, the first estimated value representing an amount of PM accumulated in the particulate filter;

determining whether to perform regeneration of the particulate filter based on the first estimated value;

upon determining to perform regeneration of the particulate filter, injecting fuel into the particulate filter through the fuel injection end and combusting the PM;

calculating a second estimated value of the estimated PM accumulation amount based on the pressure drop between the inlet and the outlet, and the flow rate of gas flowing through the particulate filter, the second estimated value representing an amount of PM accumulated in the particulate filter after completion of the regeneration;

determining whether a PM accumulation condition of the particulate filter requires user attention based on the second estimated value, wherein the step of determining whether the PM accumulation condition in the particulate filter requires user attention includes:

determining whether the second estimated value is between a second predetermined value and a predetermined basic value which is smaller than the second predetermined value;

upon determining that the second estimated value is between the second predetermined value and the predetermined basic value, adding one to an ash accumulation number representing a number of times of determining that there is ash accumulated in the particulate filter after regeneration of the particulate filter; and determining that the PM accumulation condition of the particulate filter requires the user attention when the ash accumulation number is not smaller than a third predetermined value.

* * * * *